Feb. 25, 1969 J. L. NASH 3,429,757
METHOD OF SEALING GAS TRANSFER DEVICES
Filed Aug. 26, 1965 Sheet 1 of 2
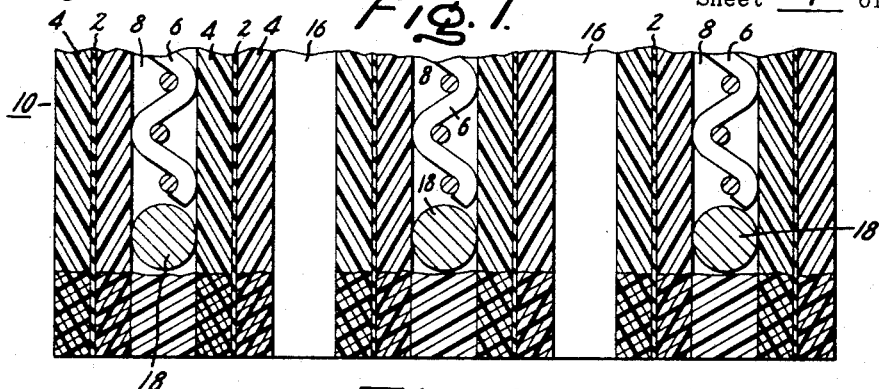
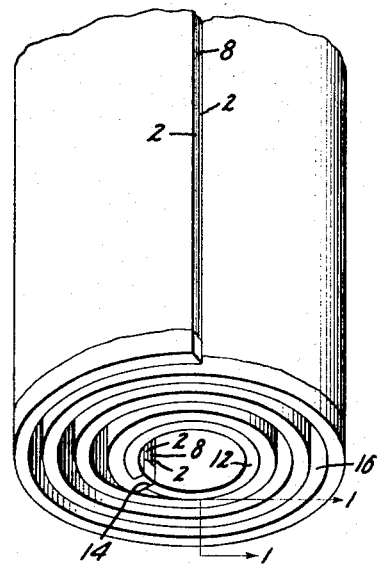
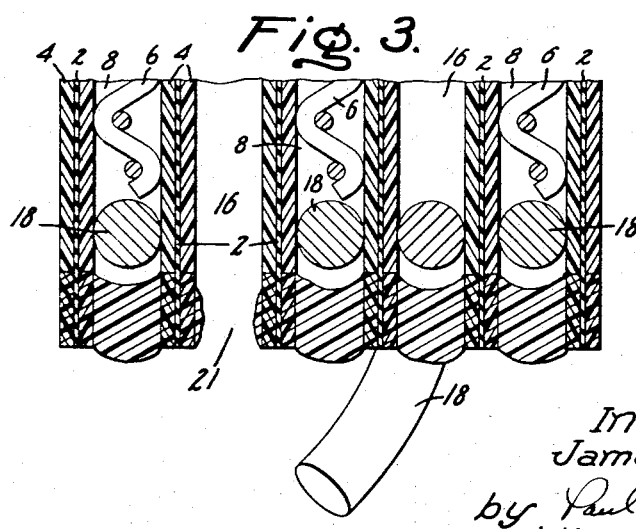
Inventor:
James L. Nash,
by Paul G. Frank
His Attorney.

United States Patent Office 3,429,757
Patented Feb. 25, 1969

3,429,757
METHOD OF SEALING GAS TRANSFER DEVICES
James L. Nash, Glens Falls, N.Y., assignor to General Electric Company, a corporation of New York
Filed Aug. 26, 1965, Ser. No. 483,393
U.S. Cl. 156—70     5 Claims
Int. Cl. B29c 27/22

ABSTRACT OF THE DISCLOSURE

A potting method for sealing together the thin, flow channel-defining membranes, which form a leak proof gas transfer apparatus, is described. Gas entrance and exit openings are located and created with removable members to which the potting compound does not adhere during the potting process. These members are removed to clear entrance and exit openings after the potting compound has set.

---

My invention relates to a way of securing gas transfer apparatus and more particularly to a process for effectively forming a leak proof device which employs a selectively permeable membrane for extracting and transferring gas or vapor to a fluid receiving medium.

In the use of membranes, especially very thin membranes, in gas separation equipment, there is a significant problem in effectively separating the flow areas on both sides of the membrane, the feed flow and the produce flow, so that they do not mix. In these devices, a selected gas permeates the membrane to form an enriched product fluid on the other side thereof. Very often the membrane permeation flow per unit area is so small that even the slightest leakage produces significant undesirable changes in the result. Thus, a substance must be capable of sealing the gas exchange device in a manner whereby leak free operation is provided. In membrane devices it is also often desirable to attach a backing to the membrane to increase its strength. In such case it is important that the sealant also impregnate the backing so that leaks do not occur. Furthermore, because the gas channels may be extremely small and closely spaced, often approximately 0.050″ apart, there is a difficult problem in sealing the device without clogging these channels. Thus, a method is needed to seal the flow area on both sides of the membrane in a manner that is inexpensive, leakproof and does not impair the flow channels which bring fluid into and out of the flow areas.

The chief object of my invention is the provision of an improved method of sealing a gas exchange apparatus by employing a potting compound.

Another object of my invention is the provision of such a method wherein flow channels are effectively formed by the sealant.

A further object of my invention is to provide a device in which gas flow areas on both sides of the membrane are properly sealed so that flow from one area to another takes place only by permeation of the membrane.

These and other objects of my invention will be more readily perceived from the description which follows.

In carrying out the objects of my invention, I provide a novel way of sealing together a gas transfer apparatus employing a thin film membrane that is selectively permeable to a gas or vapor being transferred. A plurality of imperforate membranes are stacked in parallel surface-to-surface array so that flow areas are formed therebetween. The edges of the membranes are then dipped into a siloxane potting compound to effectively seal the flow areas, save for entrance and exit openings, so that gas from one flow area must permeate the membrane to travel to another flow area. Entrance and exit openings into the flow areas are formed by inserting a material in the flow areas which does not adhere to the sealant, such as rubber strips or drawstrings, and then removing these after the sealant has set to leave gaps in the sealant which form the respective openings.

The attached drawing illustrates preferred embodiments of my invention in which:

FIGURE 1 is a cross-sectional view, taken along line 1—1 of FIGURE 2, of a typical gas exchange apparatus employing my sealing process.

FIGURE 2 is a perspective view of the apparatus of FIGURE 1.

FIGURE 3 is a cross-sectional view of the apparatus of FIGURE 1 during the sealing process showing how the flow channels are opened.

Figure 4:
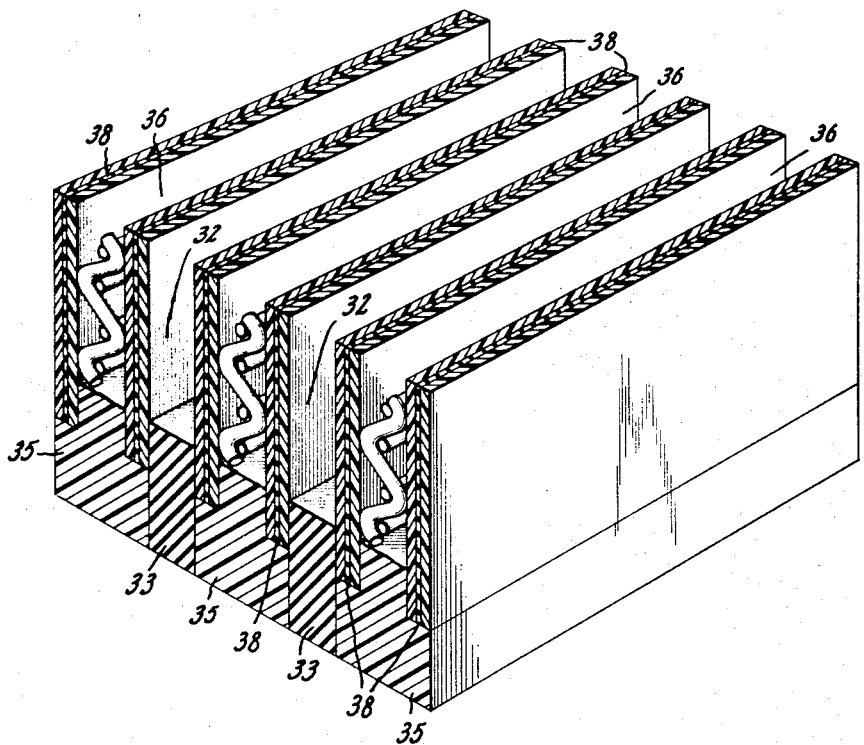
FIGURE 4 is a cross-sectional view of an alternative way of opening the channels of FIGURE 3.

In FIGURE 1 there is shown a cross-sectional view of a typical configuration of a gas exchange apparatus which employs a thin film selectively permeable imperforate membrane to transfer a specific gas or vapor from one fluid flow stream to another. Gas transfer apparatus which employ membranes operate on the basis of a partial pressure differential across the faces of the membrane. The gas or vapor that is to be transferred is at a greater partial pressure on one side of the permeable membrane than on the other side, the side it is to be transferred to. The transfer process itself is one of permeating the membrane due to the partial pressure differential and is not related to the conventional filtering process which operates solely on the basis of certain size gas molecules passing through related size holes in a membrane. A selectively permeable membrane particularly suited to my device, one which operates in the above manner, is the permselective silicone rubber membranes disclosed in patent applications Ser. Nos. 241,346 filed Nov. 30, 1962 now U.S. Patent No. 3,256,675; 247,904 filed Dec. 28, 1962 now U.S. Patent No. 3,274,750; 269,430, filed Apr. 1, 1963, now abandoned; 397,687 filed Sept. 21, 1964 now U.S. Patent No. 3,350,844 and 466,698 filed June 6, 1965 now U.S. Patent No. 3,325,330 by Walter L. Robb, all of which are assigned to the assignee of the present invention. The membrane 2, in my device, is suitably strengthened with backing means 4 to add reinforcing to the relatively weak membrane without impairing its operation. Backing 4 as shown in FIGURE 1 is secured with appropriate adhesive to the membrane on both sides thereof to form a sandwich arrangement. Suitable backing materials are polytetrafluoroethylene, various papers and other materials that readily pass gases and vapors so as not to interfere with proper functioning of the membrane. While backing material 4 is shown as secured on both sides of the membrane it will be appreciated that, depending on the desired application, only one side may be backed, or no backing may be applied at all. Suitable reinforcing and spacing means 6 is placed between backed membranes to provide a uniform opening 8 therebetween and at the same time to provide added strength to each membrane package 10, which by way of illustration comprises two backed membranes with reinforcing means 6 therebetween. Means 6 is constructed of a material, such as metal or plastic screening, that achieves the desired functions of spacing and strengthening without being affected by the gas transfer process taking place or adversely effecting it. The latter is particularly important since a reinforcing means that interferes with gas flow would substantially impair proper functioning of the apparatus. The membrane package 10 is then formed into a suitable configuration for use as a gas exchange apparatus. One such configuration is made by spirally wrapping membrane package 10 around hollow central core 12 as shown in FIGURE 2. Core 12 is constructed of a material such as plastic or metal and comprises a hollow tubular member having a slit 14 therethrough parallel to the axis of core 12. In wrapping membrane package 10 around core 12, one end of channel 8 between the two backed membranes is aligned with slit 14 and properly sealed in relation thereto, so that all flow from channel 8 passes through slit 14 and into core 12 to be employed as desired. The remainder of membrane package 10 is then wrapped in a spiral manner, layer upon layer, over central core 12. As the gas transfer device is formed, drawstring 18 or other separating means are inserted in channels 8 between backed membranes 2 and channels 16 between adjacent membrane packages, to maintain the proper spaced relationship between the membranes. Drawstrings 18 in channel 16 also serve as a means for clearing these channels, after setting of the sealant has taken place, as will be subsequently discussed. After the entire membrane device is assembled, it is dipped edgewise in a suitable sealant, preferably a potting compound that is self setting, that needs no pressure to effectively form a permanent bond, that is resilient so that changes in pressure can be effectively withstood without failure, and that has no effect on and is non toxic with respect to the gases passing through the apparatus. A suitable sealing substance is the curable siloxane potting compound described in U.S. Patent Number 3,133,891 by Cezzeriat, which is readily applied to effectively seal my gas transfer apparatus. In applying the sealing compound the edges of the rolled up gas transfer package are dipped into the sealant, as shown in FIGURE 1, to about the depth of the drawstrings. This depth of immersion is such that the device will be securely held together without the sealant interfering with flow channels 8 or 16 which, as will be explained, are essential to proper operation of the device. After the sealant has begun to set and become tacky, but before complete hardening has taken place (with the above-mentioned sealing compound this would probably be about two to five minutes) drawstrings 18 in channels 16, but not those in channels 8, are removed by pulling them out as shown with respect to channel 21 in FIGURE 3. It will be appreciated that the setting time is dependent on the desired impregnation of the various materials employed, such as the backing and the particular sealing compound used. In removing the drawstring the sealant in channels 16 is removed so that they are properly open for gas to flow through them for effective functioning of the apparatus. After removal of the drawstring the apparatus is inverted and possibly heated, often as high as 200° F., to cause the sealant in channels 8 to flow back toward screen 6 where it is stopped by drawstring 18 remaining in the channels, to fill the voids formed as the sealing process is taking place and thereby effect a more perfert seal. The step may be obviated depending on the sealing compounds used and the configuration of apparatus being sealed. If voids were allowed to remain the membranes might be overstressed when pressure is applied to the apparatus. Curing of the apparatus is now effecuated to form a more complete and even seal. It will also be appreciated that by inverting the apparatus any films of sealant formed in channels 16 are broken by the slight flow of sealant remaining therein. It is noted that both the curing process and the inverting process may be done at either room temperature or elevated temperature, depending on the sealant employed.

For illustration purposes the operation of the rolled up gas transfer device shown will be described, but it will be appreciated that this configuration is but one of many that may be constructed by my sealing process. A fluid, such as air, from a suitable supply source is passed through spiral cannel 16 while the other spiral channel 8, on the other side of the membrane is initially empty. The fluid in channel 16 contains at least one constituent that permeates the membrane. In the case of air this will be oxygen. Permeation of that gas through the membrane takes place on the basis of a difference in partial pressure across the membrane; the constituent gas flowing from an area of higher partial pressure, channel 16, to an area of lower partial pressure, channel 8. In the case of air, the partial pressure of oxygen therein, in channel 16, at atmospheric pressure, is about 3.1 pounds per square inch, whereas the partial pressure of the oxygen on the other side of the membrane, in channel 8, is essentially zero. Thus, the oxygen gas readily passes through the membrane into spiral channel 8 and through slit 14 into pipe 12 to be employed as desired. It will be appreciated that with the example described, there is no gas initially in channel 8, but alternatively, a separate receiving gas may be passed through channel 8, which will absorb the oxygen, or other gas passing through the membrane. In any case the partial pressure of the constituent gas, such as oxygen, must be less in the receiving channel 8 than in the feed channel 16 for the permeation process to take place. Because of the effectiveness of my sealing arrangement the total pressures, the pressure of all constituent gases, in the channels may be varied between wide limits without fear of rupuring or otherwise adversely affecting the secured condition of my gas transfer device.

FIGURE 4 illustrates an alternative method to effectively open flow channels in the device. In this case a strip of rubber or other material 33 that does not adhere to the potting compound is placed in channel 32, which corresponds to channel 16 of FIGURE 1. Potting then proceeds in the same manner as before with the potting compound 35 effectively sealing channel 36 which corresponds to channel 8 in FIGURE 1. After complete setting has taken place, rubber strip 33 is removed in the same manner as with the drawstring of FIGURE 1 to open channel 32. The excess potting compound extending beyond membranes 38 may then be removed if desired to form the finished gas exchange device.

A gun type injection device or other suitable applicator may be employed to squirt the potting compound into the channels, if desired.

It is apparent from the foregoing that my invention attains the objectives set forth. The method embodying my invention forms a well constructed and efficient gas exchange apparatus, that is adapted for a multitude of applications in the gas transfer field.

Specific embodiments of my invention have been described, but the invention is not limited thereto since many modifications may be made by one skilled in the art, and the appended claims are intended to cover all such modifications as fall within the true spirit and scope of my invention.

What I claim as new and desire to secure by Letters Patent of the United States is:

1. A method of making a gas transfer device comprising the steps of
   placing a plurality of imperforate membranes in parallel surface-to-surface array so that flow areas are formed therebetween,
   placing a passage opening means in some flow areas,
   applying a potting compound to edges of the membranes to enclose the flow areas therebetween and effectively separate them from each other so that fluid flowing in a flow area must permeate through a membrane to reach another flow area, and
   removing the passage opening means to form channels which communicate with some of the flow areas for passing fluids having a constituent permeable to the membrane so that the constituent may readily pass therethrough.

2. A method of making a gas transfer device comprising the steps of
   placing a plurality of imperforate silicone rubber membranes in parallel surface-to-surface array so that alternate first and second flow areas are formed therebetween, placing a rubber strip in the first flow areas, applying a siloxane potting compound to edges of the membranes to enclose the first and second flow areas and separate them from each other so that fluid flowing in a flow area must permeate through a membrane to reach another flow area, and removing the rubber strip to form channels which communicate with the first flow areas for passing fluids, having a constituent permeable to the membranes, in proximity with the membranes so that the constituent may readily permeate therethrough and into the second flow areas.

3. A method of making a gas transfer device comprising the steps of placing a plurality of imperforate silicone rubber membranes in parallel surface-to-surface array so that first and second flow areas are formed alternately therebetween, placing a first drawstring in the first flow areas, placing a second drawstring in the second flow areas, applying a siloxane potting compound to edges of the membranes to enclose the first and second flow areas therebetween and effectively separate them from each other so that fluid flowing in a flow area must permeate through a membrane to reach another flow area, removing the first drawstring to open passages which communicate with the first flow area so that a fluid containing a constituent that readily permeates the membranes may be passed in proximity with the membrane whereby the constituent will permeate through the membranes, inverting the device so that the sealant remaining in the second flow areas engulfs the second drawstring to complete the sealing process.

4. A method of making a gas transfer device comprising the steps of placing a plurality of imperforate membranes in parallel surface-to-surface array so that flow areas are formed therebetween, placing a passage opening means in some flow areas, wrapping the imperforate membranes around a central hollow core in a spiral manner, applying a potting compound to edges of the membranes to enclose the flow areas therebetween and effectively separate them from each other so that fluid flowing in a flow area must permeate a membrane to reach another flow area, and removing the passage opening means to form channels which communicate with some of the flow areas for passing fluids having a constituent permeable to the membrane so that the constituent may readily pass therethrough.

5. A method of making a gas transfer device comprising the steps of placing a plurality of backed imperforate membranes in parallel surface-to-surface array so that two sets of alternate flow areas are formed therebetween, a first and second set, placing a reinforcing screen in the second flow areas, placing a passage opening means in the first flow areas, applying a siloxane potting compound to edges of the membranes to enclose the flow areas therebetween and effectively separate them from each other so that fluid flowing in a flow area must permeate through a membrane to reach another flow area, and removing the passage opening means to form channels which communicate with the first set of flow areas for passing fluids having a constituent permeable to the membrane in proximity with the membrane so that constituent may readily permeate therethrough into the second set of flow areas.

References Cited

UNITED STATES PATENTS

| 3,232,026 | 2/1966 | McKinley | 55—16 |
| 3,246,450 | 4/1966 | Stern et al. | 55—16 |
| 3,342,729 | 9/1967 | Strand | 55—16 |
| 3,347,728 | 10/1967 | Preotle et al. | 156—293 X |
| 3,002,870 | 10/1961 | Belgarde et al. | 156—70 |
| 3,196,757 | 7/1965 | Samways | 93—35 |
| 3,372,073 | 3/1968 | Cutler | 156—294 X |

HAROLD ANSHER, *Primary Examiner.*

U.S. Cl. X.R.

55—158; 156—293, 305, 329